United States Patent
James et al.

(10) Patent No.: US 6,681,346 B2
(45) Date of Patent: Jan. 20, 2004

(54) DIGITAL PROCESSING SYSTEM INCLUDING A DMA CONTROLLER OPERATING IN THE VIRTUAL ADDRESS DOMAIN AND A METHOD FOR OPERATING THE SAME

(75) Inventors: Robert Ward James, Albuquerque, NM (US); Arthur Howard Waldie, Albuquerque, NM (US)

(73) Assignee: Goodrich Corporation, Charlotte, NC (US)

( * ) Notice: Subject to any disclaimer, the term of this patent is extended or adjusted under 35 U.S.C. 154(b) by 365 days.

(21) Appl. No.: 09/829,125

(22) Filed: Apr. 9, 2001

(65) Prior Publication Data

US 2002/0152428 A1 Oct. 17, 2002

Related U.S. Application Data

(60) Provisional application No. 60/203,203, filed on May 11, 2000.

(51) Int. Cl.⁷ .............................................. G06F 12/00
(52) U.S. Cl. ..................... 714/42; 710/308; 711/163; 711/203
(58) Field of Search ........................ 710/308; 711/163, 711/154, 152, 158, 159, 203, 156, 206; 714/2, 6, 42, 764

(56) References Cited

U.S. PATENT DOCUMENTS 4,922,486 A * 5/1990 Lidinsky et al. ............. 370/427
5,097,483 A * 3/1992 Bechtolsheim ............... 375/293
5,263,142 A * 11/1993 Watkins et al. ................ 710/22
5,301,287 A * 4/1994 Herrell et al. ............... 711/202
5,307,477 A * 4/1994 Taylor et al. .................... 711/3
5,659,798 A * 8/1997 Blumrich et al. ............. 710/26
5,956,753 A * 9/1999 Glew et al. .................. 711/205
6,353,867 B1 * 3/2002 Qureshi et al. ............. 710/305
6,532,528 B1 * 3/2003 Nishimoto et al. ......... 711/207
6,564,311 B2 * 5/2003 Kakeda et al. .............. 711/207
6,594,708 B1 * 7/2003 Slaughter et al. ........... 709/315
2001/0044889 A1 * 11/2001 James et al. ................ 711/206

* cited by examiner

Primary Examiner—Hong Kim
(74) Attorney, Agent, or Firm—David R. Percio; Calfee, Halter and Griswold LLP

(57) ABSTRACT

A digital processing system comprises a central processing unit (CPU) operating in a virtual address domain for executing both operating system software and user software to perform various processing tasks; a direct memory access (DMA) controller; a memory management unit (MMU) programmed to translate virtual memory addresses to physical memory addresses; and a plurality of memory blocks for storing digital words in registers having physical addresses; wherein the DMA controller is governed by the CPU and is operable in the virtual address domain for controlling a transfer of digital words from a source block of memory to a destination block of memory through the MMU which translates the virtual source and destination memory addresses received from the DMA controller to corresponding source and destination physical addresses of the memory. Also disclosed is a method of operating the digital processing system.

18 Claims, 3 Drawing Sheets

(BACKGROUND)

DIGITAL PROCESSING SYSTEM INCLUDING A DMA CONTROLLER OPERATING IN THE VIRTUAL ADDRESS DOMAIN AND A METHOD FOR OPERATING THE SAME

This application claims priority from U.S. Provisional Ser. No. 60/203,203 filed May 11, 2000.

BACKGROUND OF THE INVENTION

The present invention is directed to digital processing systems, in general, and more particular to a digital processing system including a DMA controller operating in the virtual address domain and a method of operating the same.

In conventional digital processing systems, a direct memory access (DMA) controller is used to transfer digital words from one location in physical memory to another. Typically, DMA controllers operate with physical memory addresses. The DMA controller generally has registers that may be programmed by a central processing unit (CPU) of the system under control of a user program, for example, with source addresses, destination addresses, number of words to be transferred during an access task, the type of the task, be it a memory to memory operation, for example, and control bits that permit the DMA controller to carry out the transfer autonomously without substantial intervention from the CPU. Ideally, the CPU can off-load the processing burden of a transfer of a block of digital words between memory locations so that it may perform other tasks in parallel with the DMA controller.

In processing systems which operate in both a virtual address domain and a physical address domain, a memory management unit (MMU) is used to translate between virtual addresses and physical memory addresses. The MMU is also used to protect memory from being improperly written into or read from, and to detect faulty memory. But, the MMU primarily coordinates its functions with the CPU and is not conventionally used with the DMA controller. Accordingly, if the DMA controller is directed to write digital words into a proper location in memory, but for some reason, it incurs a fault or upset in its address register, it could write into an improper location, like portions of the operating system, for example. Since there is no feedback to the MMU or CPU, this condition could remain dormant until the affected code is executed which could lead to devastating consequences to the system. The same could be said for improper read access tasks as a result of faults or upsets in the address register of the DMA controller. The system has no way currently of identifying such a fault in the DMA controller.

The MMU with appropriate error detection and correction (EDAC) capabilities does detect faults in the memory of the system, such as a bad bank of registers, for example, and may bring them to the attention of the CPU. However, in order to compensate for the faulty memory, the user or application software which directs DMA transfers would have to be reprogrammed to change the originally programmed physical source and/or destination addresses to new physical addresses which are not part of the faulty memory. This reprogramming, while possible, will involve modification of at least as many application software routines as can directly program the DMA system. The reprogramming of these routines will cost execution time and will have a detrimental affect on real-time embedded systems.

Another area of concern is the security of conventional processing systems. For example, errant software programs which direct DMA transfers could improperly use the DMA controller and cause problems in the system operation. This is a condition for which additional security protection is needed.

The present invention overcomes the aforementioned drawbacks of the conventional processing systems and offers security protection not currently present in these conventional systems.

SUMMARY OF THE INVENTION

In accordance with one aspect of the present invention, a digital processing system comprises a central processing unit (CPU) operating in a virtual address domain for executing both operating system software and user software to perform various processing tasks; a direct memory access (DMA) controller; a memory management unit (MMU) programmed to translate virtual memory addresses to physical memory addresses; and a plurality of memory blocks for storing digital words in registers having physical addresses; wherein the DMA controller is governed by the CPU and is operable in the virtual address domain for controlling a transfer of digital words from a source block of memory to a destination block of memory through the MMU which translates the virtual source and destination memory addresses received from the DMA controller to corresponding source and destination physical addresses of the memory.

In accordance with another aspect of the present invention, a method of operating a digital processing system comprises the steps of: storing digital words in registers having physical addresses of a plurality of memory blocks; programming a memory management unit (MMU) to translate virtual memory addresses to physical memory addresses; governing a direct memory access (DMA) controller to operate in the virtual address domain for controlling a transfer of digital words from a source block of memory to a destination block of memory through the MMU; and translating the virtual source and destination memory addresses received from the DMA controller in the MMU to corresponding source and destination physical addresses of the memory.

DETAILED DESCRIPTION OF THE INVENTION

Figure 1:
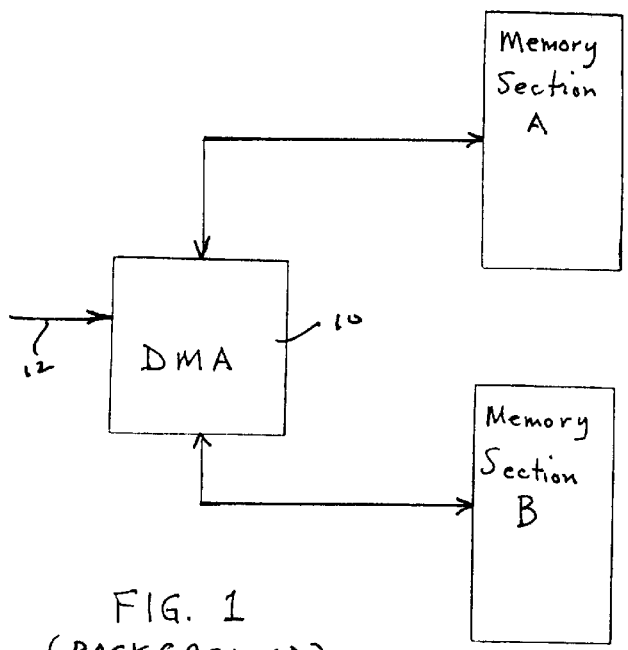
FIG. 1 is a block diagram of a conventional DMA controller interacting with memory locations for performing a transfer of digital words therebetween.

FIG. 1 is a block diagram of a conventional DMA controller of a digital processing system performing a DMA transfer of digital words between memory blocks or sections A and B. The DMA controller 10 is directed by a master processing unit, like a CPU, for example, over signal lines 12 to perform its access tasks. The DMA controller typically is operative in the physical address domain and has registers (not shown) that are programmed with the physical address or addresses of the source register(s) of the transfer which may be, for example, in memory section A, the physical address or addresses of the destination register(s) of the transfer which may be, for example, in memory section B, the number of words to be transferred, the type of transfer, and control bits that permit the initiation of the transfer as well as other functions. This data may be supplied to the DMA controller over signal lines 12 which may be part of the internal bus of the processing system. In the CPU, it is usually the user software that initiates the DMA transfer; however, the execution of one requested DMA transfer is coordinated among other possible user requested DMA transfers by the operating system software of the CPU generally on some predetermined priority schedule. Once initiated, the DMA controller may carry out the transfer autonomously. Ideally, it will not need the intervention of the CPU or other directing device.

In a DMA transfer from memory section A to memory section B, the DMA controller 10 will access a physical register in section A, read out the contents thereof and store it in a temporary register in the DMA controller 10. Thereafter, the DMA controller 10 will access a physical register in section B, and write into the register the temporary stored contents read from section A. The DMA controller will continue this access task until it has transferred all of the digital words it was directed to transfer. Then, it will indicate to the directing unit that it has completed its task and is ready for another task. As has been pointed out herein above, there are drawbacks with having the DMA controller operate in the physical address domain as well as security problems.

Figure 2:
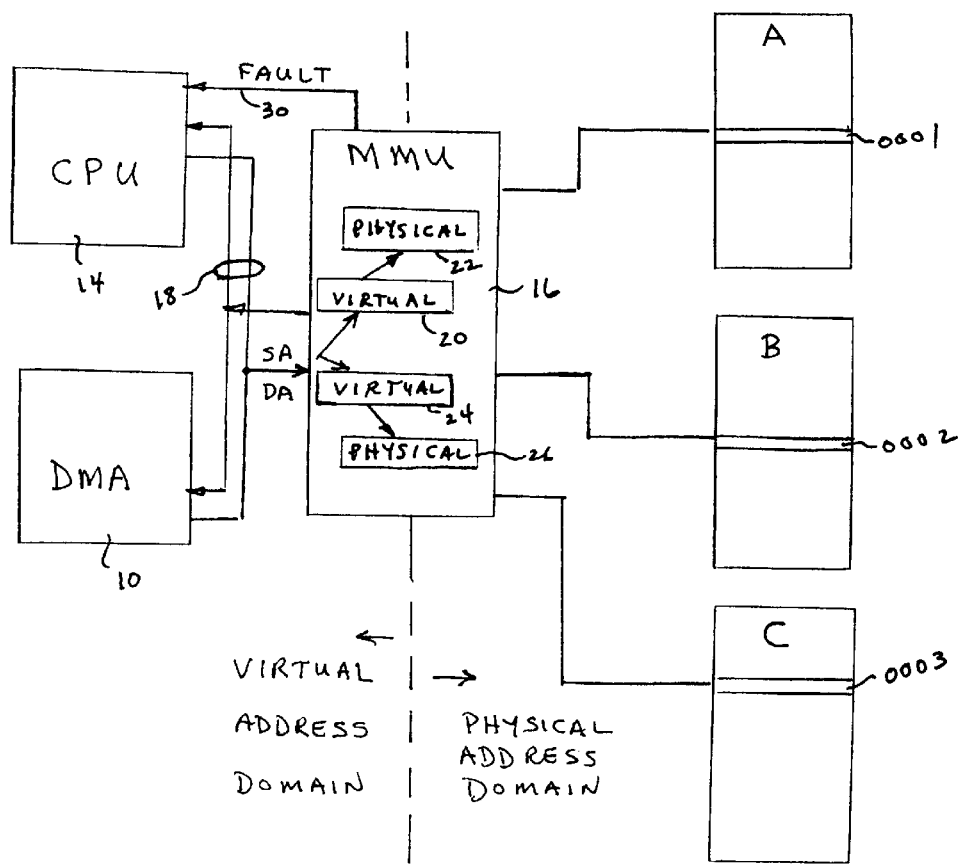
FIG. 2 is a functional block diagram of a digital processing system suitable for embodying the principles of the present invention.

In the processing system embodiment of FIG. 2, the DMA controller 10 and a CPU 14 operate in the virtual address domain and both may access registers in physical memory through a memory management unit or MMU 16. The CPU 14, DMA controller 10 and the MMU 16 may all be fabricated on an integrated circuit (IC) to enhance performance and speed of word transfers over the buses of the processing system and the digital memory blocks or sections may be external to the IC. However, this should not be considered a limitation to the present invention, but rather merely an embodiment refinement. The virtual addresses used by the CPU and the DMA are considered virtual because they may or may not be the actual physical addresses of storage registers in external memory. The MMU 16 functions to translate the virtual addresses of the CPU or DMA in the present embodiment to physical memory addresses utilizing descriptors of a table preprogrammed in a memory thereof which table being generally referred to as the translation table. The translation table may be preprogrammed by the operating system (OS) software of the CPU usually during a boot-up execution. Recent virtual to physical memory translations from the translation table may be temporarily stored in a buffer maintained by the MMU, such as a translation look-aside buffer of TLB. Accordingly, all of the virtual addresses used by the user and OS software of the CPU are uniquely mapped in the MMU 16 to physical memory addresses of the real memory blocks like those shown at A, B and C in FIG. 2, for example.

The MMU 16 is also operative to protect certain blocks of memory against improperly being written into or read from using preprogrammed protection codes assigned to the physical addresses of predetermined blocks of memory. These codes may be assigned to a field of the descriptors, for example. The MMU 16, with associated conventional data protection mechanisms, is also capable of detecting a faulty memory block of registers and cause a remapping of the physical addresses of the translation table to avoid or by-pass the detected faulty blocks of memory. In the present embodiment, this remapping will of course be transparent to the DMA controller 10 and user programs of the CPU. They will continue using the same virtual addresses as if nothing unusual has occurred notwithstanding the change in physical memory addresses thereof. It is understood that in some processing systems, the OS software is the preferred vehicle to coordinate the definition and redefinition of the memory blocks, i.e. what will be put in the memory and where it will be put. So, an indication of the detection of a faulty memory block may be provided to the OS software of the CPU in order for it to diagnose the source of the fault, if possible, and then to direct the MMU 16 to substitute a different block of physical memory addresses for the faulty memory addresses in the translation table.

Figures 4, 5:
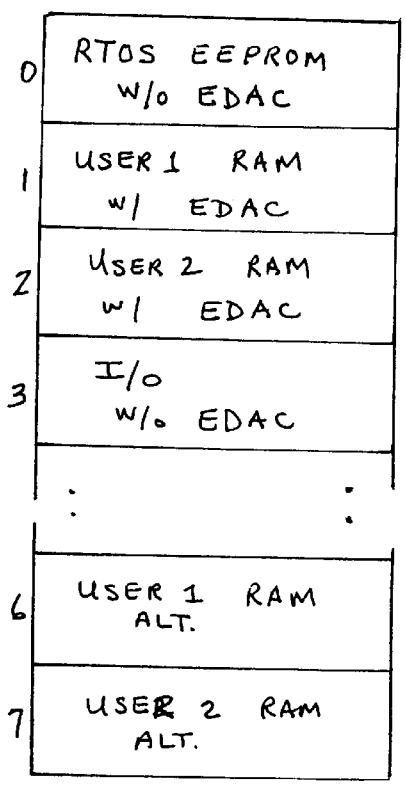
FIG. 4 illustrates an exemplary mapping of memory blocks for use in the embodiment of FIG. 2.
FIG. 5 illustrates a translation table suitable for use in the embodiment of FIG. 2.

In the example depicted in FIG. 2, the DMA controller 10 may be directed by the CPU over processor bus lines 18 to perform a transfer of a block of digital words from memory section A to memory section B. Once initiated, the DMA controller 10 begins the transfer by conducting the virtual address of the first source register (SA) of the transfer to the MMU 16 over the system bus 18 and issuing a read access task command. In response, the MMU 16 stores the source address in a temporary virtual address register 20 and searches through its preprogrammed virtual addresses of the TLB and/or translation table to find a match with the virtual address supplied by the DMA controller 10. A simple example of virtual to physical address translations are shown by the table of FIG. 5 wherein the virtual addresses are stored in the columns of the left-hand side. If the virtual SA is 0001, a match would be found in the second row of the table and the corresponding physical address 0001 which happens to be the same as the virtual address is written into the memory access register 22 of the MMU 16 to access the memory section A to carry out the read operation of physical register 0001 which is conducted to the DMA 10 and stored in a temporary storage register thereof. As shown by the memory mapping example of FIG. 4, the memory block 0001 refers to a USER 1 random access memory (RAM) section.

Next, the DMA controller 10 will conduct a virtual address of the destination register (DA) to the MMU 16 which will store it in a temporary storage register and again search through the translation table for a match of virtual addresses. If the destination address is 0002, it is found in the third row of the table example of FIG. 5 and the corresponding physical address 0002 is stored in the access register 26 to write into the physical memory register the contents of the temporary register of the DMA 10. Before each read or write access task, the MMU 16 looks at the protection code associated with the physical memory location of each translation. The protection codes are shown by way of example in the table of FIG. 5 in the second column thereof going from left to right. If certain of the protection codes are set, then the transfer to that physical location of memory will require particular permissions which the MMU 16 will identify from the control bits supplied to it from the DMA controller 10. A fault detection in this area will be explained herein below. If the permission code is proper, the DMA controller 10 will continue to supply source and destination addresses to the MMU 16 which respond by translating them into their corresponding physical addresses and performing the access task requested until all of the digital words have been transferred.

Figure 3:
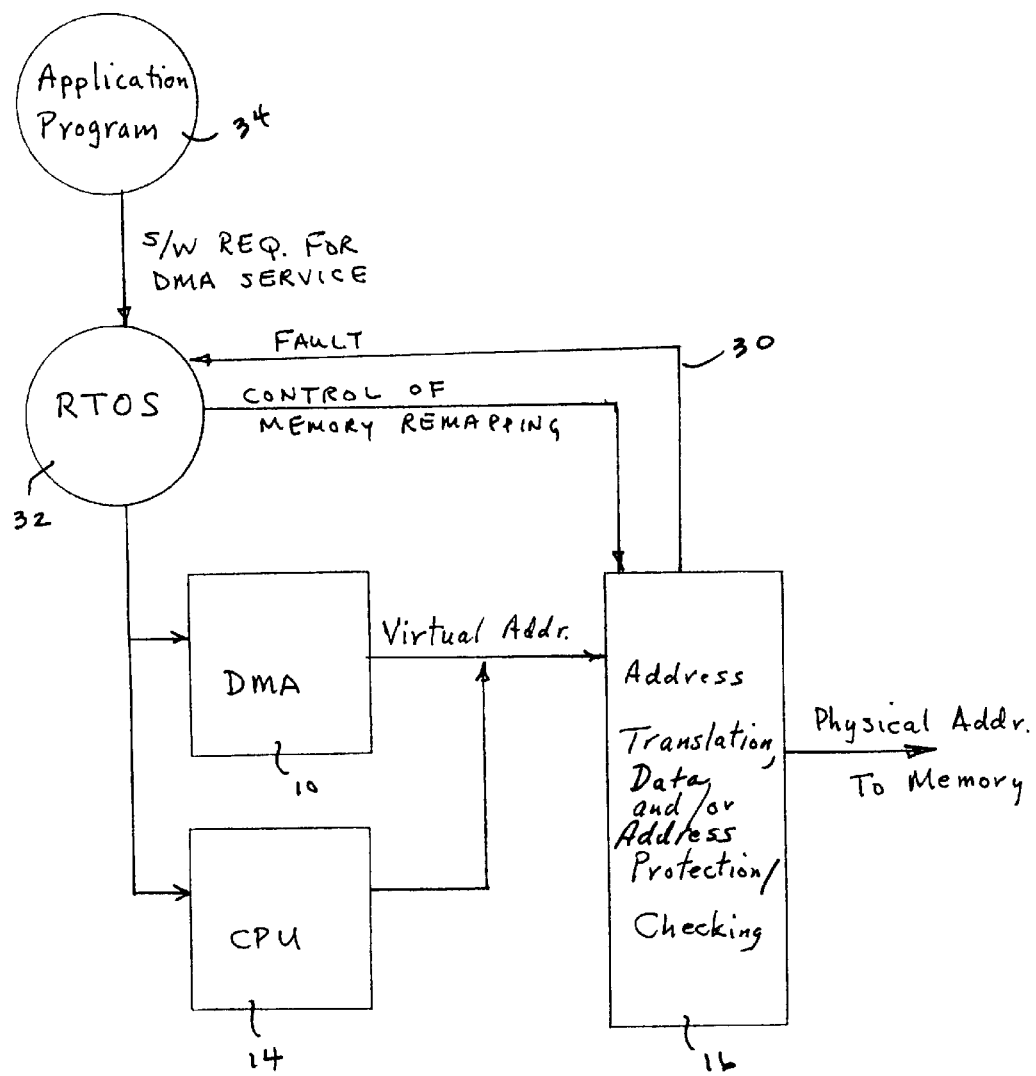
FIG. 3 is another functional block diagram exemplifying software interaction for the embodiment of FIG. 2.

If the MMU 16 determines that memory block 0002 is faulty, for example, it will alert the OS software of the CPU 14 of this fault condition over a signal line 30. The function of this software interaction is shown more clearly in the functional diagram of FIG. 3 wherein the fault indication is shown being supplied to a real time operating system (RTOS) depicted by the circle 32. In operation, the user or application software shown by the circle 34 of the processing system request DMA service from the DMA controller 10 via the RTOS 32 which coordinates transfer activities of the DMA controller 10 among other user software requests. At the proper time the RTOS software 32 may pass along the instructions to the DMA controller 10 for performing the directed transfer which occurs to the DMA controller 10 and user software in the virtual address domain. When the RTOS 32 receives the fault indication signal 30 from the MMU 16, it may call for a user diagnostic program to be performed by the CPU 14 in order to determine the source of the fault. If RTOS 32 determines that the memory block 0002 is bad and can no longer be safely used, then it will remap the translation table of the MMU 16 to substitute another memory block or bank of registers having a different physical address, say 0003, for example. In the table of FIG. 5, for example, the physical address of the third row will be changed from 0002 to 0003. Accordingly, the next time the MMU 16 is requested to transfer digital words to the virtual memory block 0002 by the DMA 10, the MMU 16 will instead transfer the words to the physical memory block 0003 as shown in the example of FIG. 2. Note that no change is performed in the user software and DMA controller, both being substantially unaffected by the remapping of the physical addresses of the MMU. In other words, the DMA controller 10 will continue to issue the same virtual source and destination addresses for its transfers as before the remapping.

Now, suppose for some reason or other, the address register of the DMA controller incurs an upset and attempts to perform an improper read or write operation. For example, it may request a write to the memory block 0000 which contains the RTOS which is protected from being written into without permission. In this situation, the MMU 16 would check the control bits associated with the transfer and determine from the protection bits it has programmed into its translation table whether or not the transfer is proper. If the transfer is determined by the MMU 16 to be improper as in the immediate example, then the MMU 16 would again issue a fault indication to RTOS 32 over signal lines 30 to alert RTOS of the condition and cause the transfer activity to be suspended. In response, RTOS may call upon a diagnostic program to identify the source of the fault. If RTOS 32 determines that the fault was due to a temporary upset, it may clear the upset and request the DMA controller to continue the transfer operation. On the other hand, if the fault appears to be permanent, RTOS may discontinue service to the DMA until the fault is corrected. Accordingly, there is always proper feedback provided to RTOS 32 of any improper DMA transfers to and from memory and in this manner, the memory is fully protected against improper DMA transfers, a degree of protection not heretofore provided.

With regard to security, the MMU offers the protection to systems operating autonomously such as the CPU and DMA controller channel(s). The protection afforded by way of the MMU attributes covers the address space or domain over the entire physical memory area without regard to the system using the space. The attributes used to define the address space can include memory characteristics such as the ability to support EDAC protection and read/modify/write capabilities, as well as access rights. The security and fault tolerance of the system is greatly enhanced by including DMA transfers under the protection schemes of the MMU of the present invention. Thus, a higher degree of security is added to the processing by the present invention.

While the present invention is described above in connection with one or more embodiments, it is understood that it should not be limited to any single embodiment, but rather construed in breadth and broad scope in accordance with the recitation of the appended claims.

We claim:

1. A digital processing system comprising:
   a central processing unit (CPU) operating in a virtual address domain for executing both operating system software and user software to perform various processing tasks;
   a direct memory access (DMA) controller;
   a memory management unit (MMU) programmed to translate virtual memory addresses to physical memory addresses;
   a plurality of memory blocks for storing digital words in registers having physical addresses;
   said DMA controller governed by said CPU and operable in the virtual address domain for controlling a transfer of digital words from a source block of memory to a destination block of memory through the MMU which translates the virtual source and destination memory addresses received from said DMA controller to corresponding source and destination physical addresses of said memory;
   wherein the MMU includes means for detecting an improper access task from the DMA controller; and
   wherein the DMA controller includes means responsive to said detected improper access ask by the MMU for suspending said task.

2. The system of claim 1 wherein the MMU includes protection codes associated with the translations from virtual to physical addresses, said protection codes comprising codes that represent predetermined permissions for access tasks for the physical memory; and wherein the detecting means of the MMU detects the improper access task from the DMA controller based on said protection codes and the translation the MMU is directed to perform for said task.

3. The system of claim 2 wherein the MMU includes a look-up table of preprogrammed virtual address to physical address translation, said table including a protection code associated with each programmed translation.

4. The system of claim 2 wherein the detecting means of the MMU includes means for generating a signal indicative of the detected improper access task issued by the DMA.

5. The system of claim 4 wherein the generated signal from the MMU is directed to the CPU which is responsive to said signal to diagnose the source of the improper access task.

6. The system of claim 2 wherein the improper access task is one of a read and write access to at least one memory register.

7. The system of claim 1 wherein the MMU includes means for detecting a fault in memory and generating a signal indicative of said fault and the portion of memory associated therewith; and wherein the CPU is responsive to said fault signal to reprogram the physical address of at least one translation of said MMU to redirect future access tasks to physical addresses of memory different from the physical addresses of said faulty portion of memory.

8. The system of claim 7 wherein the MMU is programmed with no substantial effect on the DMA which is operating in the virtual address domain.

9. The system of claim 7 wherein the MMU is reprogrammed with no substantial effect on the user programs which are executed in the virtual address domain.

10. A method of operating a digital processing system comprising the steps of:

storing digital words in registers having physical addresses of a plurality of memory blocks;

programming a memory management unit (MMU) to translate virtual memory addresses to physical memory addresses;

governing a direct memory access (DMA) controller to operate in the virtual address domain for controlling a transfer of digital words from a source block of memory to a destination block of memory through the MMU;

translating the virtual source and destination memory addresses received from said DMA controller in the MMU to corresponding source and destination physical addresses of said memory;

detecting an improper access task from the DMA controller; and suspending the detected improper access task.

11. The method of claim 10 including the steps of: programming the MMU with protection codes associated with the translations from virtual to physical addresses, said protection codes comprising codes that represent predetermined permissions for access tasks for the physical memory; and detecting the improper access task from the DMA controller based on said protection codes and the translation the MMU is directed to perform for said task.

12. The method of claim 11 programming the MMU with a look-up table of preprogrammed virtual address to physical address translations, said table including a protection code associated with each programmed translation.

13. The method of claim 11 including generating a signal indicative of the detected improper access task issued by the DMA.

14. The method of claim 13 including diagnosing the source of the improper access task in response to the generated signal.

15. The method of claim 11 wherein the improper access task detected is one of a read and write access to at least one memory register.

16. The method of claim 10 including the steps of: detecting a fault in memory and generating a signal indicative of said fault and the portion of memory associated therewith; and reprogramming the physical address of at least one translation of said MMU to redirect future access tasks to physical addresses of memory different from the physical addresses of said faulty portion of memory in response to said fault signal.

17. The method of claim 16 reprogramming the MMU with no substantial effect on the DMA which is operating in the virtual address domain.

18. The method claim 16 including reprogramming the MMU with no substantial effect on user programs of a central processing unit which are executed in the virtual address domain.

* * * * *

UNITED STATES PATENT AND TRADEMARK OFFICE
CERTIFICATE OF CORRECTION

PATENT NO. : 6,681,346 B2
DATED : January 20, 2004
INVENTOR(S) : Robert Ward James and Arthur Howard Waldie It is certified that error appears in the above-identified patent and that said Letters Patent is hereby corrected as shown below:

Column 6,
Line 33, "ask" should read -- task --;
Line 65, "programmed" should read -- reprogrammed --.

Signed and Sealed this

Fourteenth Day of December, 2004

JON W. DUDAS
*Director of the United States Patent and Trademark Office*